(12) United States Patent
Dwyer et al.

(10) Patent No.: US 7,634,159 B2
(45) Date of Patent: Dec. 15, 2009

(54) SYSTEM AND METHOD FOR PARALLEL COMPUTATION OF AN ARRAY TRANSFORM

(75) Inventors: Malcolm R. Dwyer, Glendale Heights, IL (US); James E. Crenshaw, Palatine, IL (US); Zhiyuan Li, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 972 days.

(21) Appl. No.: 11/007,142

(22) Filed: Dec. 8, 2004

(65) Prior Publication Data

US 2006/0120622 A1    Jun. 8, 2006

(51) Int. Cl.
*G06K 9/60* (2006.01)
(52) U.S. Cl. ............................ 382/307; 712/10; 712/16; 382/281
(58) Field of Classification Search ............. 712/16–22; 382/281, 308, 307
See application file for complete search history.

(56) References Cited

U.S. PATENT DOCUMENTS

| | | | |
|---|---|---|---|
| 4,868,752 A | 9/1989 | Fujii et al. | |
| 5,430,810 A | 7/1995 | Saeki | |
| 6,408,105 B1 | 6/2002 | Maruo | |
| 6,430,319 B1 * | 8/2002 | Takatsu | 382/281 |
| 6,636,881 B1 * | 10/2003 | Fujiwara | 708/210 |
| 2002/0114518 A1 | 8/2002 | Wilt | |
| 2003/0123736 A1 | 7/2003 | Xu | |
| 2003/0228057 A1 * | 12/2003 | Paquette | 382/199 |

FOREIGN PATENT DOCUMENTS

WO    WO 9533241 A1 * 12/1995

OTHER PUBLICATIONS

Duller et al "Image processing application using an associative processor array" Proceedings of the Alvey Vision Conference 1989 in further view of Pillmeier.*
Pillmeier, Matthew R.; Schulte, Michael J.; Walters, Eugene G., III "Design alternatives for barrel shifters" Advanced Signal Processing Algorithms, Architectures, and Implementations XII. Edited by Luk, Franklin T. Proceedings of the SPIE, vol. 4791, pp. 436-447 (2002).*
Implementation of a Parallel Hough Transform Processor; Conen, Klefenz, Männer, Zoz; in: Buzuloiu V. (ed.): Proc. Workshop on Image Processing for Future High Energy Physics Detectors, Erice, 1992, World Scientific.*
Brad, Remus. "License Plat Recognition System". Computer Science Department, "Lucian Blaga" University, Sibiu, Romania.
Kamat, Varsha et al. "An Efficient Implementation of the Hough Transform for Detecting Vehicle License Plates Using DSP's". School of Engineering and Computer Science, Oakland University, Rochester, MI 48309-4401. IEEE 1995.

* cited by examiner

*Primary Examiner*—Bhavesh M Mehta
*Assistant Examiner*—Sean Motsinger

(57) ABSTRACT

An array transform system for parallel computation of a plurality of elements of an array transform includes a memory for storing an array of data elements. Each column of data elements from the memory is copied to a shifter that shifts the column of data elements in accordance with a shift value to produce a shifted column of data elements. The shifted columns of data elements are accumulated in a plurality of accumulators, with each accumulator producing an element of the array transform. A controller controls the shift value dependent upon the position of the column of data elements in the array of data elements.

22 Claims, 8 Drawing Sheets

SYSTEM AND METHOD FOR PARALLEL COMPUTATION OF AN ARRAY TRANSFORM

FIELD

This invention relates generally to the field of array signal processing. More particularly, this invention relates to a system and method for computation of an array transform.

BACKGROUND

A common problem in image processing is to find primitives such as lines, curves, circles and ellipses in frames of image data. One approach is to use a Hough transform. The Hough transform maps a point in the image to a curve in the transform domain that indicates the parameters of all primitives passing through the point. If the primitive is a straight line, the Hough transform of the entire image is mathematically equivalent to a 2-dimensional discrete Radon transform or a Slant Stack transform. However, when computing a 2-dimensional discrete Radon transform or a Slant Stack transform it is usual to calculate the transform value at each point in the transform domain from a set of points in the image array.

Calculation of the transform is computationally expensive. This presents problem for applications where rapid computation is required at a low cost. An example is the analysis of video frames from an automobile video camera, for applications such as vehicle guidance and license-plate reading. Another example is computer vision for robots. All of these applications require real-time processing of video frames.

Prior applications in this area have focused mainly on the design of algorithms for implementation on general-purpose processors, such as personal computers, digital signal processors or general-purpose image processors.

Custom hardware has been proposed for analyzing a Hough transform.

The Hough transform requires mapping a point in the image to a curve in the transform array. There are two approaches to the computation of the Hough transform. The first approach is to use a large number of accumulators, one for each point in the transform array. This approach results in complex hardware, such as computer graphics cards. The second approach is to use a single accumulator and to store the transform array in a memory. This approach is slow because of the requirement to perform multiple read and write operations for each image point to move partial sums between the memory and the accumulator.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
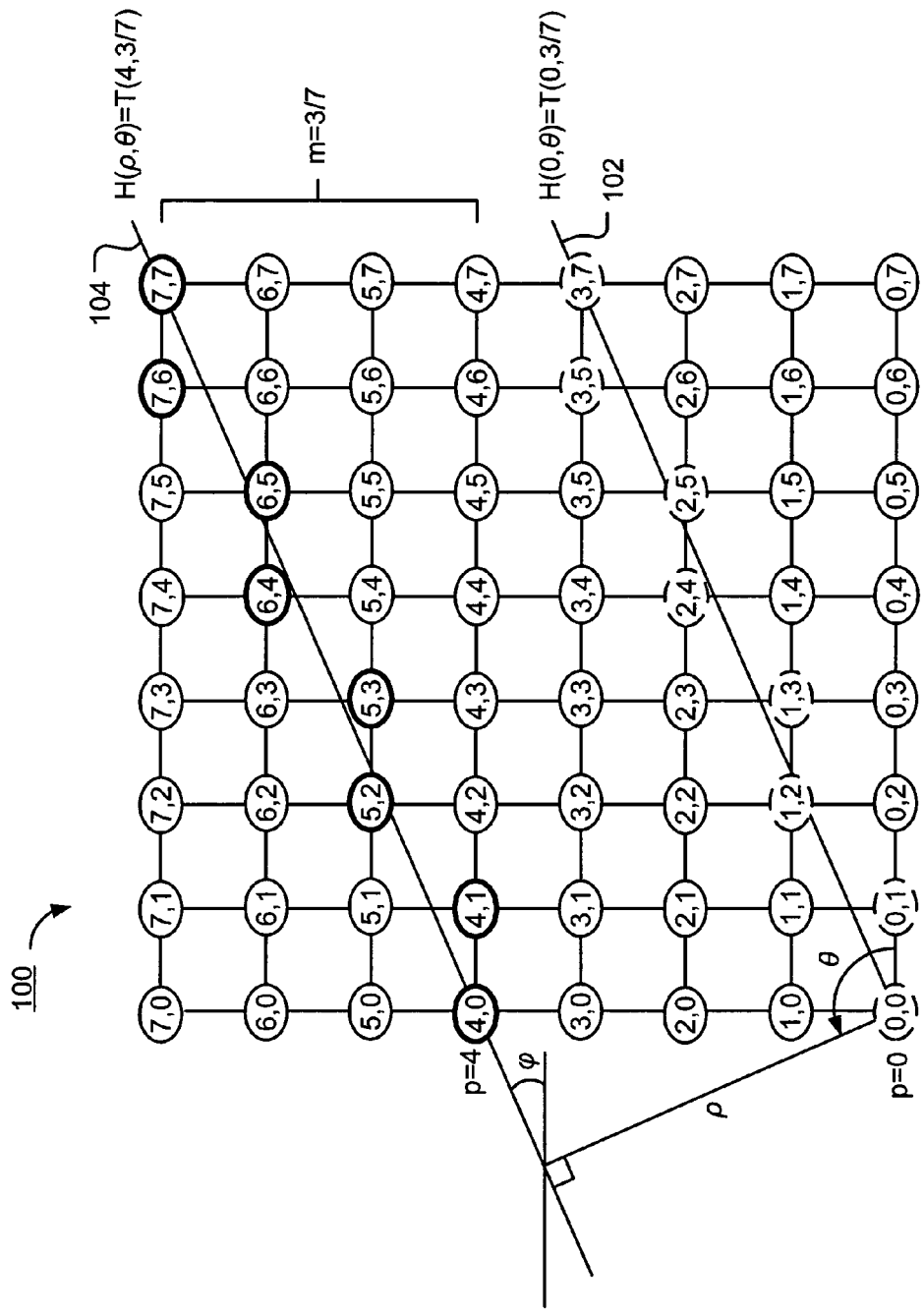
FIG. 1 is a diagrammatic representation of an array of data elements showing straight line primitives.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The Hough transform, commonly used in image processing, and the 2-dimensional Slant Stack transform, commonly used in the analysis of seismic recordings, are both discrete forms of the 2-dimensional Radon transformation. In the Hough transform, each point in the 2-dimensional data space is transformed to a curve in the transform space, whereas in the Slant Stack and Radon transforms a point in the transform space is calculated from a curve in the data space. In one variant of the transform, the transform of an N×N array A is obtained by summing array values, one from each column of the array, along a series of lines. The lines may be described in polar form by their distance $\rho$ from an origin and the angle $\theta$ to the horizontal axis. These lines satisfy the equation $\rho = x\cos(\theta) + y\sin(\theta)$, where x and y are the horizontal and vertical coordinates within the array (i.e. the integer values of x are the column indices and the integer values of y are the row indices). Alternatively, the lines may be described in slope-intercept form by their slope m and the position p where the line intercepts the vertical axis. These lines satisfy the equation $y = mx + p$. This is illustrated in FIG. 1 for an 8×8 array A(y,x) with reference numeral 100. y denotes the row index and x denotes the column index. Where the line does not pass directly through a point of the array, a value is obtained by interpolation.

The slope-intercept form of the transform is written as $$T_N(p, m) = \sum_{x=0}^{N-1} A'(p + mx, x), \tag{1}$$

where x is a column index, and A'(p+mx,x) is an interpolated value from column x of the array A. The polar form and slope-intercept form are equivalent and are related by $$H_N(\rho, \theta) \equiv T_N\left(\frac{\rho}{\sin(\theta)}, -\cot(\theta)\right), \tag{2}$$

$$T_N(p, m) \equiv H_N\left(\frac{p}{\sqrt{m^2+1}}, -\cot^{-1}(m)\right).$$

In the simplest form of the transform, the interpolation uses the nearest element in the column. The nearest element has row index: $p + \overline{mx}$, where $\overline{mx}$ denotes the nearest integer to mx.

If the row index is less than one, or greater than N, the corresponding term in the summation is set to zero. This form of the transform can be written as $$T_N(p, m) \equiv \sum_{x=0}^{N-1} A(\overline{mx} + p, x). \quad (3)$$

It is noted that $\overline{mx}$ denotes a shift applied to column x for a slope m, and that the same shift is applied to each element in the summation, independent of the parameter p. One embodiment of the present invention makes use of the property.

FIG. 1 shows an 8×8 array A with reference numeral 100. In accordance with equation (3), the transform element $T_8(0, 3/7)$ is obtained by summing elements along the line 102. The line starts at the element A(0,0) and ends at the element A(3,7). The slope of the line is m=3/7. The array elements shown with broken lines are the array elements closest to the line 102 in each column. The transform element $T_8(4,3/7)$ is obtained by summing elements along the line 104. The transform element $T_8(4,3/7)$ is equivalent to the transform element $H_8(\rho,\theta)$. The line starts at the element A(4,0) (so p=4) and ends at the element A(7,7). The slope of the line 104 is also m=3/7. The elements shown with solid bold lines are the elements closest to the line in each column. Other terms in the transform are obtained in a similar fashion. Transforms for other size arrays, including non-square arrays, may be defined similarly.

The partial sum over n columns is denoted by $$T_n(p, m) \equiv \sum_{x=0}^{n-1} A(\overline{mx} + p, x). \quad (4)$$

We also introduce vector notation, namely $$T_n(:, m) \equiv \begin{bmatrix} T_n(0, m) \\ T_n(1, m) \\ \vdots \\ T_n(N-1, m) \end{bmatrix}, A(:, m) \equiv \begin{bmatrix} A(0, m) \\ A(1, m) \\ \vdots \\ A(N-1, m) \end{bmatrix} \quad (5)$$

This gives the recurrence relationship $$T_1(:,m)=A(:,0),$$

$$T_{n+1}(:,m)=T_n(:,m)+P(\overline{mn})A(:,n), n=1,\ldots,N-1 \quad (6)$$

where P(k) denotes a shift applied to a column of the array A. Mathematically, the shift operator can be written as a matrix with the elements of the $k^{th}$ diagonal equal to one and other elements zero. For example, when N=6, $$P(2) = \begin{bmatrix} 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \end{bmatrix}, P(-1) = \begin{bmatrix} 0 & 0 & 0 & 0 & 0 & 0 \\ 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \end{bmatrix}. \quad (7)$$

In a physical embodiment the shift may be performed using a barrel shifter or other shifting device.

In general, P(k) is an interpolation operator or matrix.

Figure 2:
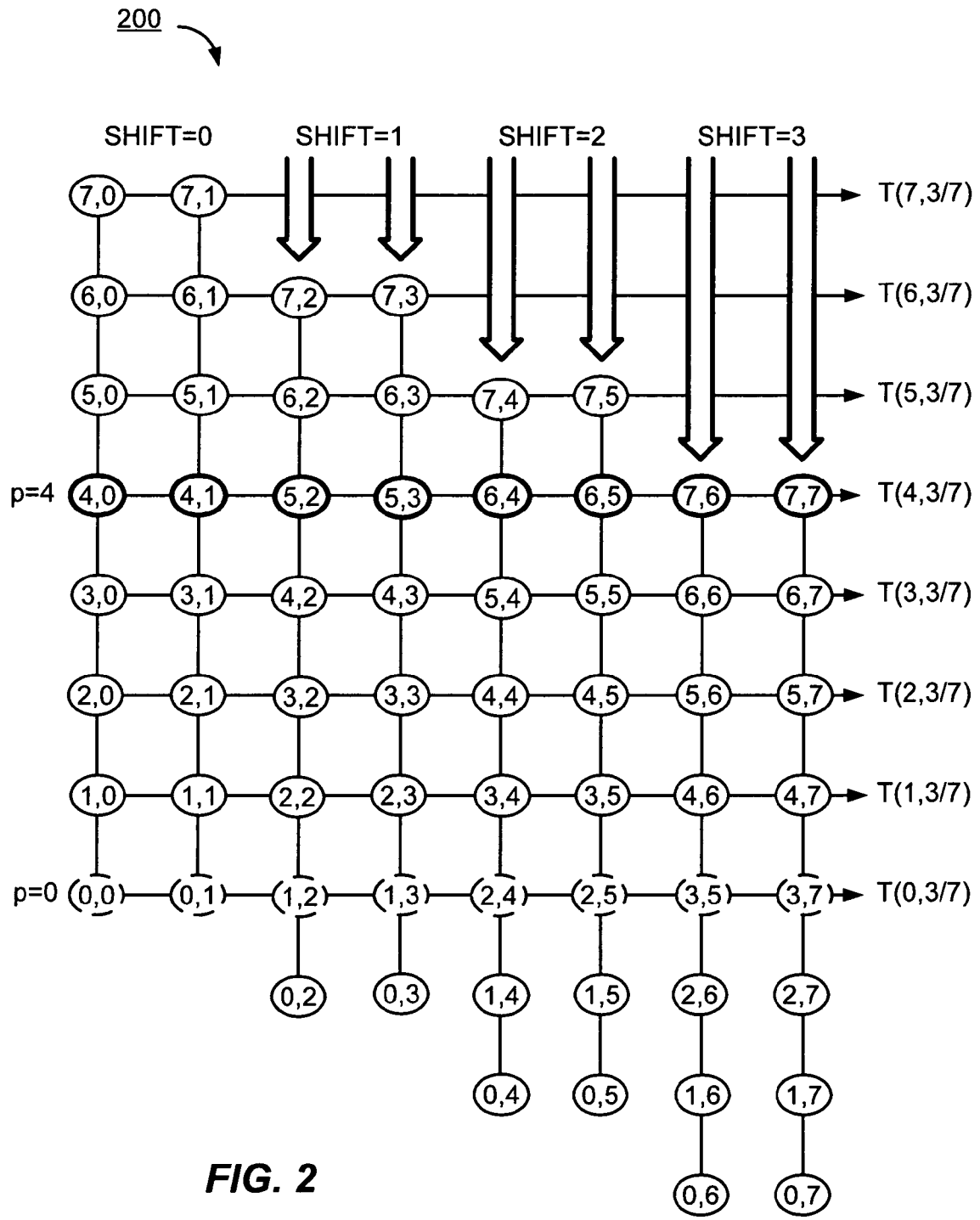
FIG. 2 is a diagrammatic representation of an array of data elements with shifted columns in accordance with an embodiment of the invention.

Equation (6) is a vector equation showing that the $m^{th}$ column of the transform array can be calculated by shifting and accumulating columns of the array A. The array 100 is illustrated in FIG. 2. FIG. 2 shows the array A of FIG. 1 with the columns shifted downwards. The shifts for columns 0-7 are given by $$s = \left\{0, \frac{3}{7}, \frac{6}{7}, \frac{9}{7}, \frac{12}{7}, \frac{15}{7}, \frac{18}{7}, \frac{21}{7}\right\}^T = \{0, 0, 1, 1, 2, 2, 3, 3\}^T,$$

respectively. In FIG. 2, it can be seen that the terms of the transform for m=3/7 can be obtained by summing or accumulating along rows of the shifted array 200.

The transform may be used to match shape templates (or primitives) other than straight lines. The shape template may be a curve, an ellipse or a circle for example. For more complicated shapes, the parameter m may be a vector. For a given shape with parameter m, a shift operator P(n, m) can be found for each column n and each parameter m that shifts points on the template to a single row in the shifted array. The computation is represented by the recurrence equation $$T_1(:,m)=P(0,m)A(:,0),$$

$$T_{n+1}(:,m)=T_n(:, m)+P(n,m)A(:,n), n=1,\ldots,N-1 \quad (8)$$

Figure 3:
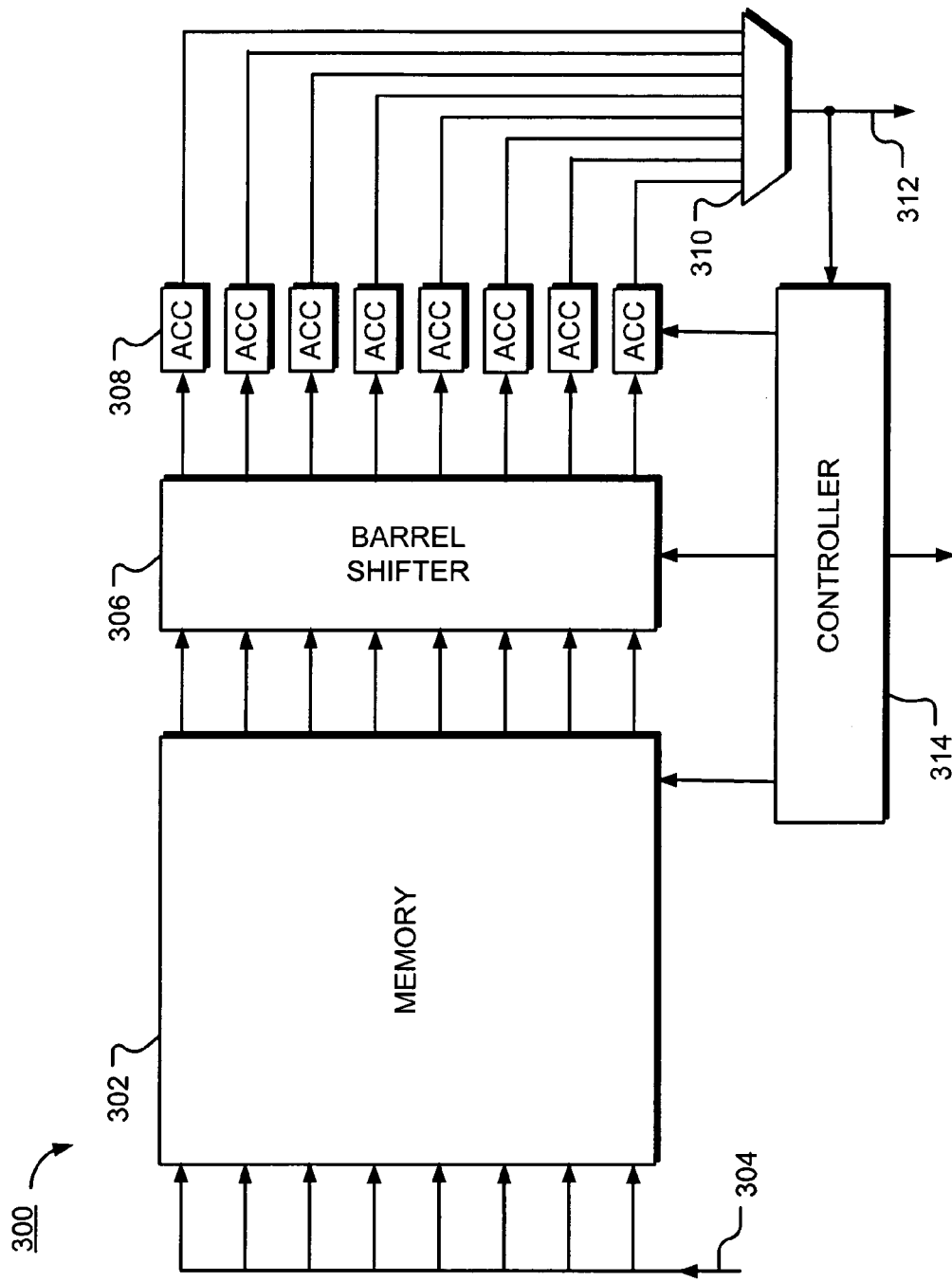
FIG. 3 is a block diagram of an array transform system in accordance with an embodiment of the invention.

One aspect of the present invention relates to a hardware system for performing the operation in equation 6. An embodiment of a system for computing an array transform, such as a Hough, Radon or Slant Stack transform, is shown in FIG. 3. Referring to FIG. 3, the array transform system 300 comprises a memory 302 for storing elements of an array, received via input 304, a barrel shifter 306, a plurality of accumulators 308 and an output multiplexer 310 that provides a vector output 312. The memory 302, barrel shifter 306 and accumulators 308 are controlled by a controller 314. The operation of the system is described below with reference to the flow chart shown in FIG. 4.

In a further embodiment of the array transform system, in which the array is an array of binary data elements, the accumulators are counters that are incremented whenever a '1' is located in the corresponding position of the shifted column of data elements.

Figure 4:
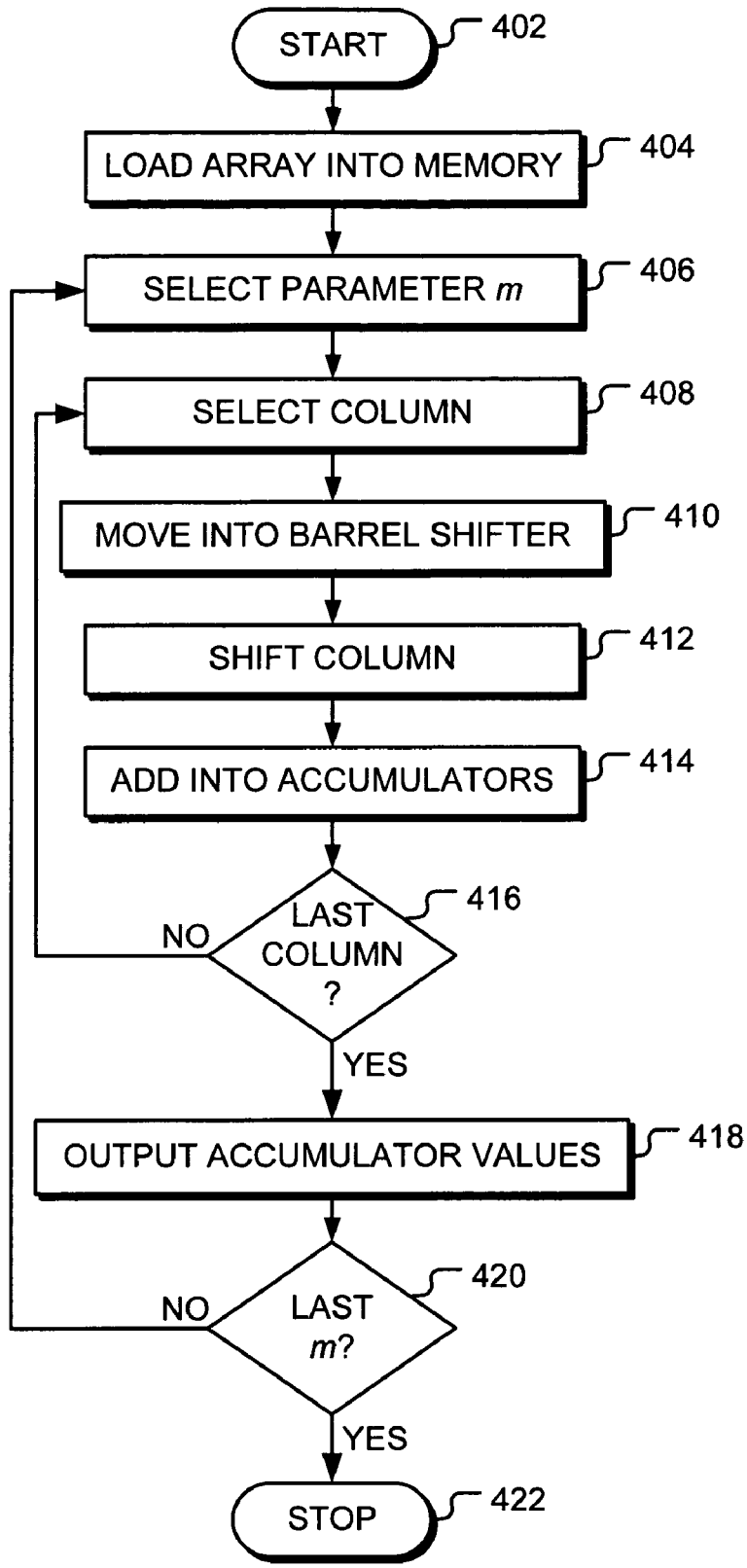
FIG. 4 is a flow chart of a method for performing an array transform in accordance with an embodiment of the invention.

Following start block 402 in FIG. 4, an array of data elements to be transformed is loaded into the memory at block 404. The accumulators are set at zero at this time. If the array contains 1-bit data, each column of the array may be stored as a data word. At block 406 a transform parameter is selected. The transform parameter may represent the slope m of the line, the angle θ of a perpendicular to the line, for example, or combination of parameters of a primitive. The transform parameter m will be used by way of explanation. At block 408 a column of the array is selected from the memory and at block 410 the column is moved into the barrel shifter. At block 412, the barrel shifter shifts the data by a specified number of bit positions determined from the column index and the transform parameter, m. The shifted column of data elements is then accumulated in accumulators at block 414. Thus, the accumulator p holds the partial sum for the element T(p,m). At decision block 416 a check is made to determine if all of the columns of the array have been shifted and accumulated. If not, as indicated by the negative branch from decision block 416, flow returns to block 408 and another column is selected. If all of the columns have been shifted and accumulated, as indicated by the positive branch from decision block 416, the accumulator values are output at block 418. This completes the computation of the transform for the selected value of the transform parameter, m. At decision block 420 a check is made to determine if the transform has been calculated for the last value of the parameter m. If so, as indicated by the positive branch from decision block 420, the computation is complete and the process terminates at block 422. If the transform is to be calculated for more values of the parameter m, as indicated by the negative branch from decision block 420, flow returns to block 406 and the next value of the parameter m is selected.

One application of the present invention is in the field of image processing, where the array is an array of pixel values. A common task in image processing is the detection of edges. This may be performed by applying a difference operator, such as Sobel gradient operator, to a pixel array. The absolute value of the resulting array is then quantized to 1-bit to give a binary array in which elements are either 0 or 1. The columns of the binary array can be conveniently stored as data words in a memory. In order to detect primitives, such as straight lines or curves, in the binary array, a transform is applied. Large values in the transform domain correspond to primitives in the binary array. For example, referring to FIG. 1 and FIG. 2, if the binary array had the value 1 at each of the locations denoted by the bold lines, then the accumulated value T(4,3/7) would be large compared to other values, indicating that the image had a line starting at (4,0) with slope 3/7.

In one embodiment of the invention, the controller 314 in FIG. 3 is further operable to search the accumulator outputs 312 to find transform elements above a threshold value and pass only those values as an output for further processing.

Large images may be broken in sub-images before processing. One advantage of this approach is that complex curves in the large image can be approximated by straight lines or simple curves in the sub-images.

Figure 5:
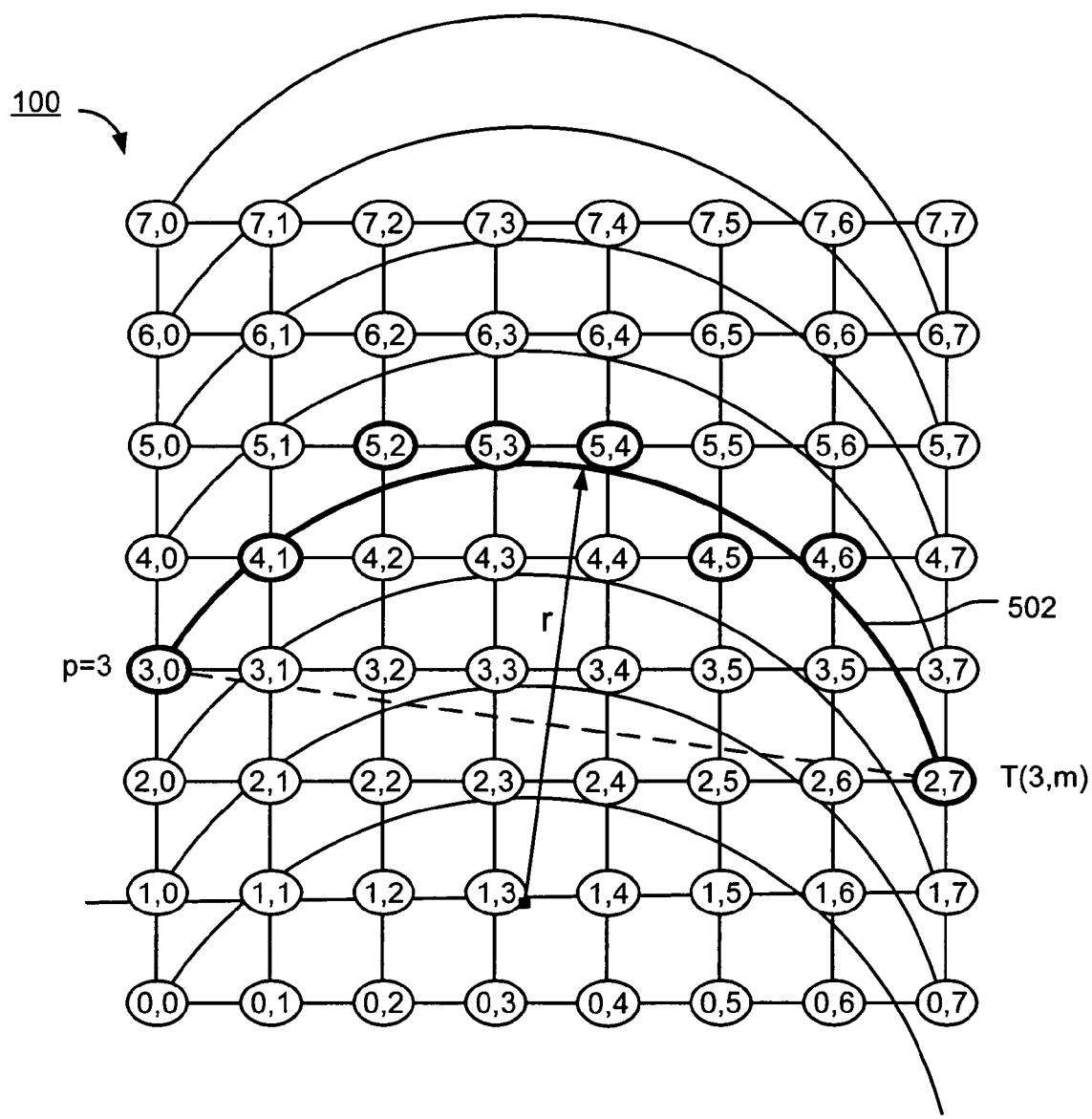
FIG. 5 is a diagrammatic representation of an array of data elements showing curved line primitives.
Figure 6:
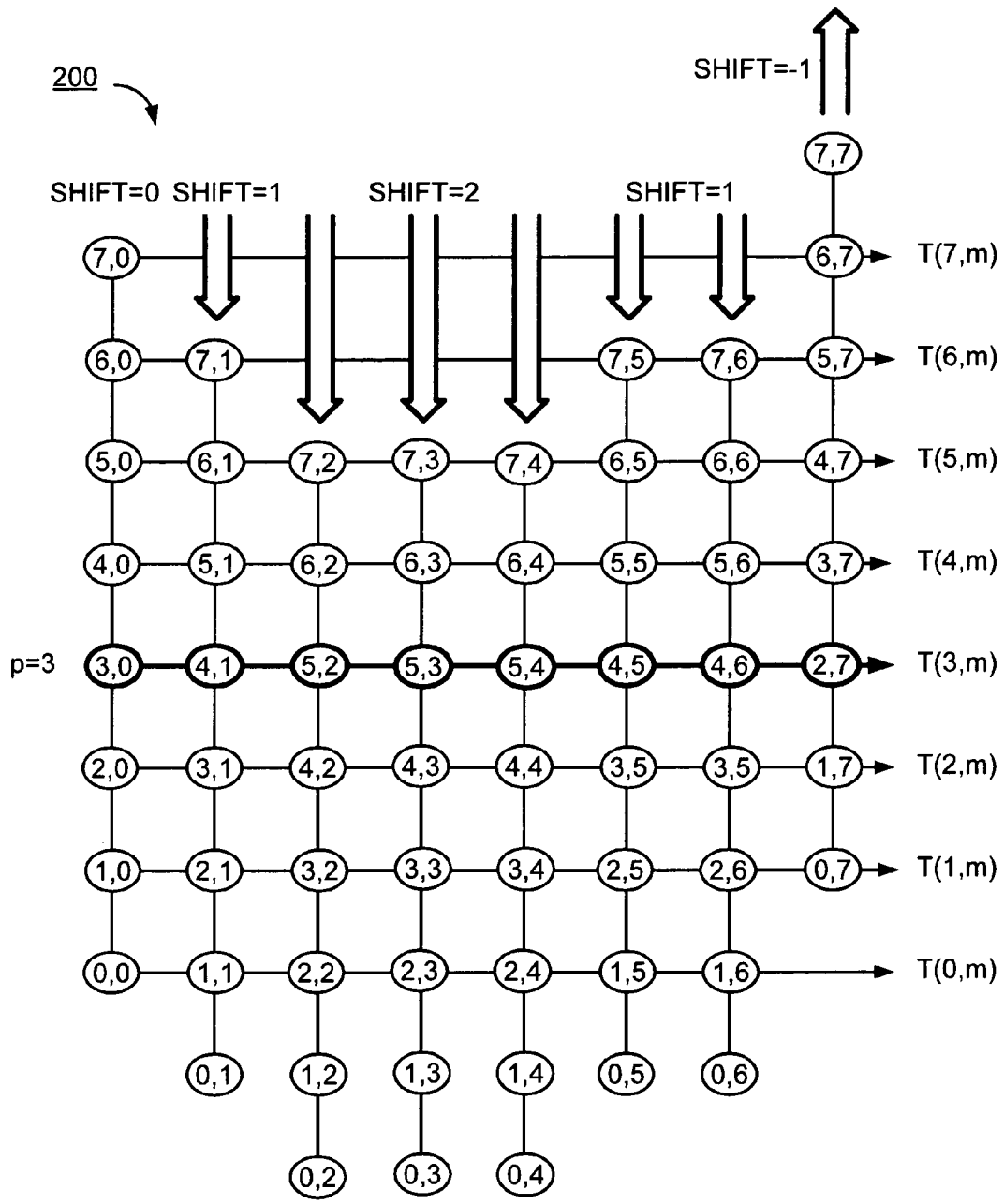
FIG. 6 is a diagrammatic representation of an array of data elements with shifted columns in accordance with an embodiment of the invention.

The transform may use primitives other than straight lines. For example, in FIG. 5, the primitives are circular arcs. FIG. 6 shows the array A of FIG. 5 with the columns shifted. The shifts for columns are chosen so that points closest to the primitive are moved to appear on a row of the shifted array 200. In FIG. 6, it can be seen that the terms of the transform for parameter m can be obtained by summing or accumulating along rows of the shifted array 200. The shift values are $s=\{0,1,2,2,2,1,1,-1\}^T$. The circular arcs could be parameterized by the intercept p with the left edge of the array, the slope m of the chord (shown by the dotted line) and the radius r of the arc, for example. Hence the bold arc has parameters p=3, m=−1/7, r=3.9. The other arcs in FIG. 5 all have parameters m=−1/7 and r=3.9, but have different values of the parameter p. The system of the present invention allows parallel computation of the transform for different values of the parameter p, since the shift values s are independent of p.

In accordance with a further embodiment of the invention, the transpose of the array of data elements can be loaded into the memory. This allows for primitives that are more vertically oriented than horizontally oriented to be used.

Figure 7:
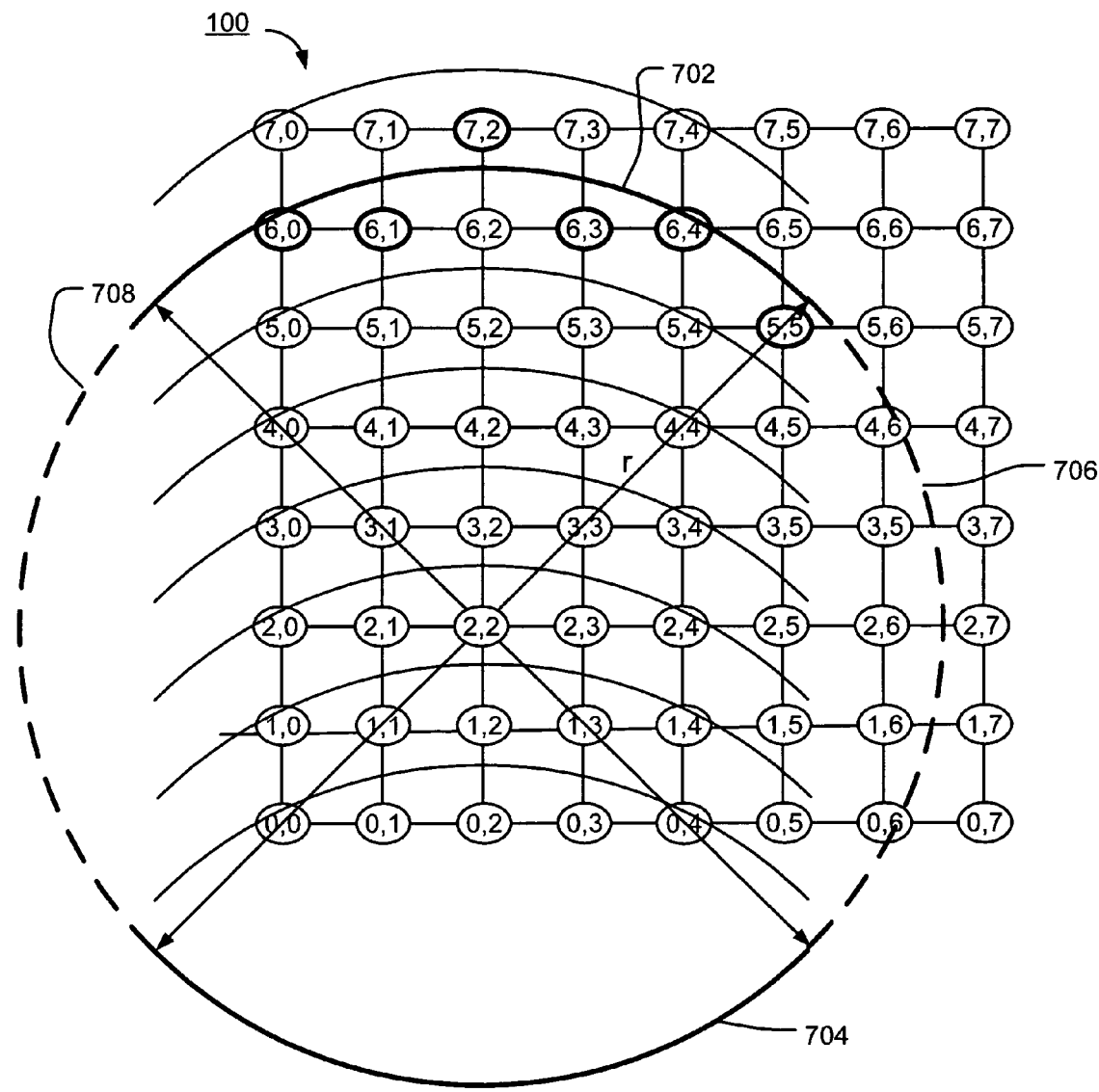
FIG. 7 is a diagrammatic representation of an array of data elements showing circular line primitives.

FIG. 7 shows an example where the primitive is a circle. The circle is made up of four arcs, 702, 704, 706 and 708. The contribution to the transform from each arc is calculated separately, then the four contributions are added to produce the final transform. FIG. 7, illustrates the computation of the upper arc 702. The shifts can be referenced to any point, for example if the center of the circle is used, the shifts are $s = \{4,4,5,4,4,3,8,8\}^T$. If the top of the circle is used, the shifts are $s = \{1,1,0,1,1,2,8,8\}^T$. A shift of 8 or more denotes that the column does not contribute to the transform. The circular arcs could be parameterized by p={row position of the center of the circle} and m={column position of the center of the circle, radius r, arc number}, for example. The contributions to the transforms for all values of p can be calculated at the same time, as denoted by the vertically displaced copies of the arc 702 in FIG. 7. The lower arc 704 and vertically displaced copies of the lower arc can be calculated in a similar manner, using the same data set but with different shift values. The contributions to the transform from the right arc 706 and the left arc 708 are calculated by loading a rotated version of the data array into the memory. The array is rotated by 90°, so that the arcs 706 and 708 are close to horizontal. Computation of the contributions then continues as before. Finally, the contributions from all four arcs are added for each parameter value p.

Figure 8:
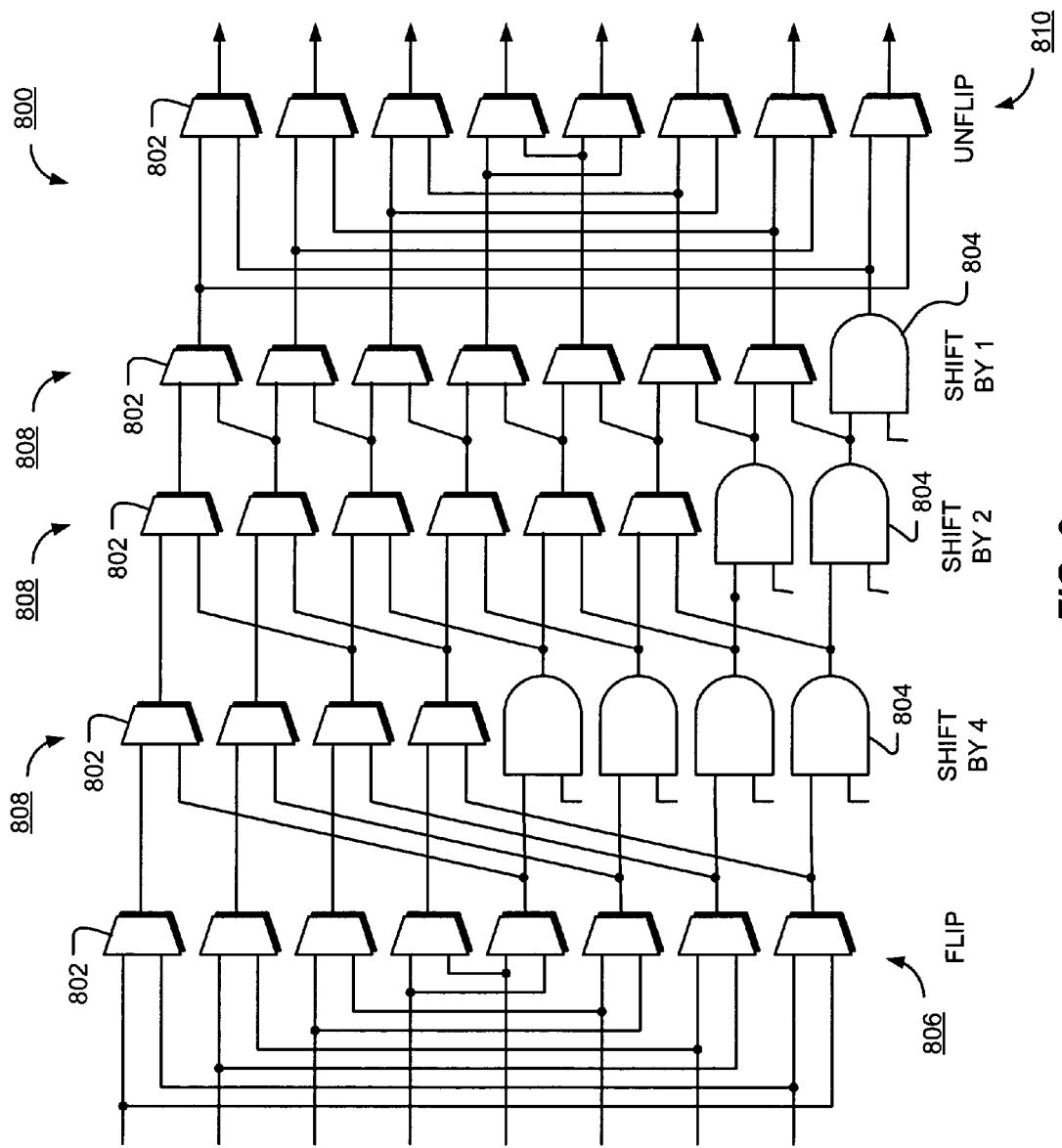
FIG. 8 is a block diagram of a barrel shifter in accordance with an embodiment of the invention.

FIG. 8 is a block diagram of an exemplary barrel shifter in accordance with an embodiment of the invention. An 8-bit barrel-shifter 800 is shown having 3 inner, shifting layers of components 808 (denoted by SHIFT BY 4, SHIFT BY 2 and SHIFT BY 1 in FIG. 8). A corresponding N-bit barrel would have $\log_2(N)$ inner layers of components (rounded upwards if N is not a power of 2). The inner shifting layers 808 of the barrel-shifter 800 allow input data to be shifted in one direction only. Shifting in the other direction is achieved by an outer reversal layer 806 (denoted by FLIP) that flips or reverses the order of the elements in the input. The original order of the elements is recovered by a second outer reversal layer 810 (denoted by UNFLIP) that again reverse the order of the elements. Each layer comprises a number of multiplexers, 802. The inner shifting layers 808 also include logical AND units 804 that may be used to pad the input with zeros. When $N \geq 8$, the use of the two outer reversal layers (FLIP 806 and UNFLIP 810) reduces the number of multiplexers compared to a two-way barrel-shifter. If an application does not require the order of the elements to be maintained, the UNFLIP output reversal layer may be omitted. For example, to shift up by 3 places, the multiplexers in the FLIP layer, SHIFT BY 4 layer and UNFLIP layers are set to select the upper inputs, while the multiplexers in the SHIFT BY 2 and SHIFT BY 1 layers are set to select the lower inputs. To shift down by 5 places, the multiplexers in the FLIP, UNFLIP, SHIFT BY 4 and SHIFT BY 4 layers are set to select the lower inputs, while the multiplexers in the SHIFT BY 2 layer are set to select the upper inputs. The inner shifting layers may be arranged in any order.

An embodiment of an N-bit barrel shifter would have M shifting layers, where M is an integer no less than log2(N). The $m^{th}$ shifting layer of the shifter would be operable to pass or shift a column of data elements by an amount dependent upon the shift value. In one embodiment, the $m^{th}$ shifting layer may comprises $N-2^m$ multiplexers and $2^m$ logical AND units and be capable of shifting a column of data elements by $2^m$ places. In a further embodiment the $m^{th}$ shifting layer comprises N multiplexers and is operable to rotate a column of data elements by $2^m$ places.

Other shifting devices may be used without departing from the invention.

Those of ordinary skill in the art will recognize that the present invention has been described in terms of exemplary embodiments. However, the invention should not be so limited, since the present invention could be implemented using hardware component equivalents such as special purpose hardware and/or dedicated processors, which are equivalents to the invention as, described and claimed. Similarly, general purpose computers, microprocessor based computers, digital signal processors, microcontrollers, dedicated processors, custom circuits, field programmable gate arrays, ASICS and/ or dedicated hard-wired logic may be used to construct alternative equivalent embodiments of the present invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An array transform system for parallel computation of a plurality of elements of an array transform, the array transform system comprising:
   a memory for storing an array of data elements, the array comprising a plurality of columns of data elements;
   a single shifter operable to receive, in turn, each column of data elements from the memory and produce a series of shifted columns of data elements in accordance with a shift value for each column of data elements;
   a plurality of accumulators, each accumulator operable to add a series of data elements at one position of the series of shifted columns of data elements to an accumulated value for the one position of the series of shifted columns of data elements to produce an element of the array transform; and
   a controller operable to control the shift values dependent upon the position of the column of data elements in the array of data elements.

2. An array transform system in accordance with claim 1, wherein the data elements of the array comprise binary elements and wherein an accumulator of the plurality of accumulators comprises a counter.

3. An array transform system in accordance with claim 1, wherein the controller is further operable to search the plurality of elements of the array transform to find the one or more largest elements.

4. An array transform system in accordance with claim 1, wherein the controller is further operable to set the shift value dependent upon the position of the column of data elements within the array of data elements and dependent upon a transform parameter.

5. An array transform system in accordance with claim 1, wherein the shifter comprises an N-bit barrel shifter comprising:
   a first reversal layer comprising N multiplexers, the first reversal layer being operable to produce a second column of data elements by passing a first column of data elements when the shift value indicates a shift in a first direction and reversing the order of the column of data elements when the shift value indicates a shift in a second direction; and
   M shifting layers, where M is an integer no less than log2(N), an $m^{th}$ shifting layer being operable to pass or shift a column of data elements by an amount dependent upon the shift value,
wherein the first shifting layer of the M shifting layers is operable to receive the second column of data elements.

6. An array transform system in accordance with claim 5, wherein the $m^{th}$ shifting layer comprises N-$2^m$ multiplexers and $2^m$ logical AND units and is operable to shift a column of data elements by $2^m$ places.

7. An array transform system in accordance with claim 5, wherein the $m^{th}$ shifting layer comprises N multiplexers and is operable to rotate a column of data elements by $2^m$ places.

8. An array transform system in accordance with claim 5, further comprising:
   a second reversal layer comprising N multiplexers, the second reversal layer being operable to receive a shifted column of data elements from the M shifting layers and to pass the shifted column of data elements if the shift value is in the first direction and to reverse the order of the shifted column of data elements if the shift value is in the second direction.

9. A method for using a single column shifter and a plurality of accumulators to calculate a plurality of elements of an array transform of an array of data elements stored in a memory, the method comprising:
   selecting a transform parameter;
   for each column of data elements of the array of data elements in turn:
      copying the column of data elements into the single column shifter;
      shifting the column of data elements in accordance with a shift value to obtain a shifted column of data elements and
      adding each data element of the shifted column of data elements to a corresponding accumulated value stored in an accumulator of the plurality of accumulators to produce a plurality of accumulated values; and
   outputting the plurality of accumulated values as the plurality of elements of the array transform.

10. A method in accordance with claim 9, further comprising, for each column of data elements of the array of data elements in turn:
   setting the shift value dependent upon the position of the column of data elements within the array of data elements and the transform parameter.

11. A method in accordance with claim 10, wherein the shift value for column with index x is the nearest integer to a product of x with the transform parameter.

12. A method in accordance with claim 9, further comprising searching the plurality of elements of the array transform to identify one or more largest accumulated values.

13. A method in accordance with claim 9, wherein the transform parameter is the slope of a straight line primitive.

14. A method in accordance with claim 9, wherein the transform parameter is the angle between a reference axis and a line perpendicular to a straight line primitive.

15. A method in accordance with claim 9, wherein the array transform is a transform selected from the group consisting of a Hough transform, a discrete Radon transform and a slant stack transform.

16. A method in accordance with claim 9, wherein the shift value for each column is selected to shift data elements closest to a primitive in the array of data elements to a row in an array formed by the shifted columns of data elements.

17. A method for using a single barrel shifter and a plurality of accumulators to calculate an array transform of an array of data elements, the method comprising:
   storing the array of data elements in a memory;
   for each first transform parameter of a first plurality of transform parameters;
      for each column of data elements of the array of data elements in turn:
         copying the column of data elements into the single barrel shifter;
         shifting the column of data elements in accordance with a first shift value to obtain a shifted column of data elements; and
         adding each data element of the shifted column of data elements to a corresponding accumulated value stored in an accumulator of the plurality of accumulators to produce a plurality of accumulated values; and outputting the plurality of accumulated values as a first plurality of elements of the array transform;

storing a transpose of the array of data elements in the memory;

for each second transform parameter of a second plurality of transform parameters;

for each column of data elements of the transpose of the array of data elements in turn:

copying the column of data elements into the single barrel shifter;

shifting the column of data elements in accordance with a second shift value to obtain a shifted column of data elements; and adding each data element of the shifted column of data elements to a corresponding accumulated value stored in an accumulator of the plurality of accumulators to produce a plurality of accumulated values; and outputting the plurality of accumulated values as a second plurality of elements of the array transform.

18. A method in accordance with claim 17, further comprising:

setting the first shift value dependent upon the position of the column of data elements within the array of data elements and the first transform parameter; and setting the second shift value dependent upon the position of the column of data elements within the transpose of the array of data elements and the second transform parameter.

19. A method in accordance with claim 17, further comprising searching the first and second pluralities of elements of the array transform to identify one or more largest elements.

20. A method for using a single shifter and a plurality of accumulators to calculate a plurality of elements of an array transform of an array of data elements stored in a memory, the method comprising:

selecting a transform parameter corresponding to a transform primitive;

storing the array of data elements in a memory;

for each column of data elements of the array of data elements in turn:

copying the column of data elements into the shifter;

shifting the column of data elements in accordance with a first shift value, determined by a first section of the transform primitive, to obtain a first shifted column of data elements; and adding each data element of the first shifted column of data elements to a corresponding accumulated value stored in an accumulator of the plurality of accumulators to produce a first plurality of elements of the array transform;

storing a rotation of the array of data elements in a memory:

for each column of data elements of the rotation of the array of data elements in turn:

copying the column of data elements into the shifter:

shifting the column of data elements in accordance with a second shift value, determined by a second section of the transform primitive, to obtain a second shifted column of data elements; and adding each data element of the second shifted column of data elements to a corresponding accumulated value stored in an accumulator of the plurality of accumulators to produce a second plurality of elements of the array transform; and adding at least one term of the first plurality of elements of the array transform and at least one term of the second plurality of elements of the array transform that correspond to sections of the same transform primitive.

21. A method in accordance with claim 17, wherein the first plurality of transform parameters relate to primitives having substantially horizontal arcs and the second plurality of transform parameters relate to primitives having substantially vertical arcs.

22. A method in accordance with claim 20, wherein the first plurality of transform parameters relate to primitives having substantially horizontal arcs and the second plurality of transform parameters relate to primitives having substantially vertical arcs.

\* \* \* \* \*